UNITED STATES PATENT OFFICE.

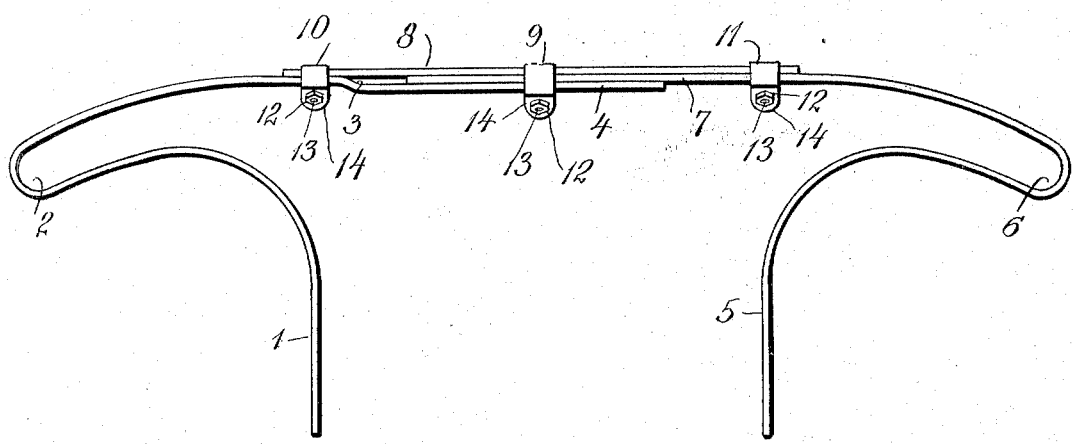
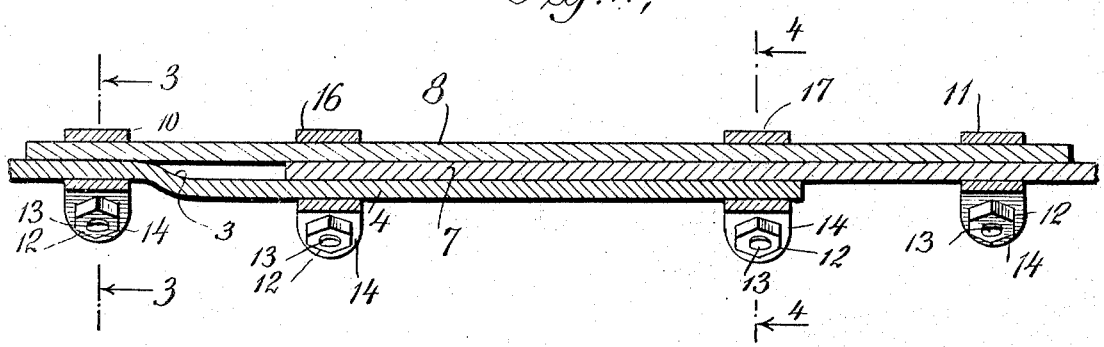
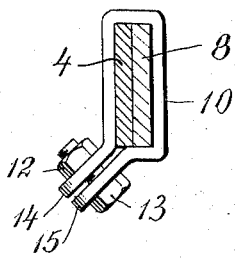
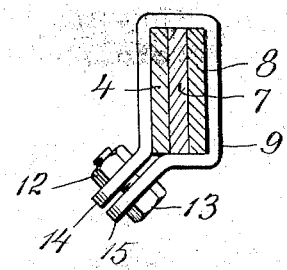

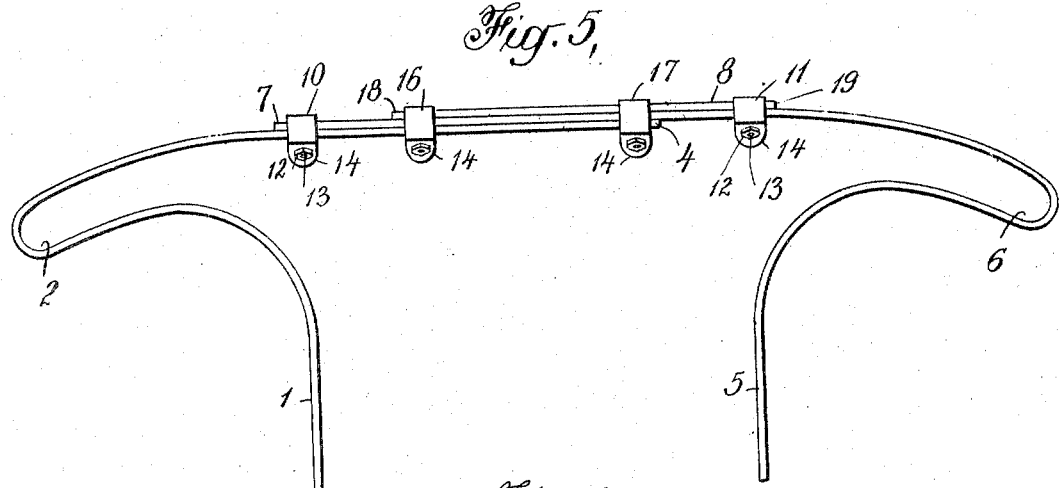
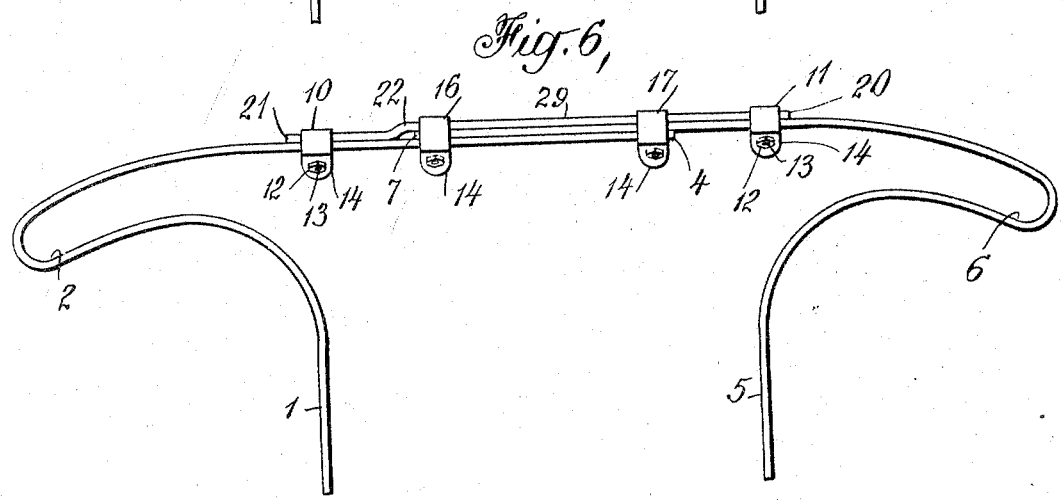
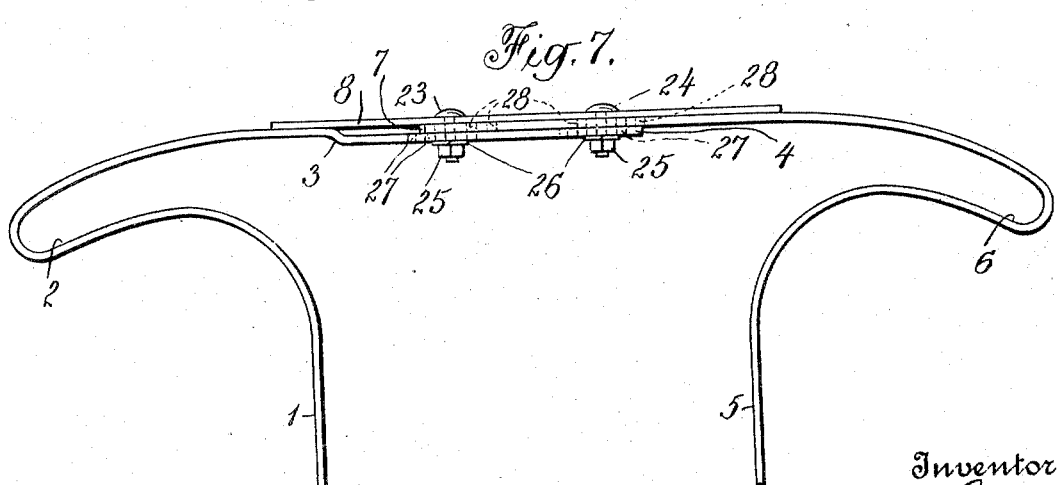

GEORGE ALBERT LYON, OF PHILADELPHIA, PENNSYLVANIA.

REINFORCED VEHICLE-BUFFER.

1,325,735. Specification of Letters Patent. Patented Dec. 23, 1919.

Application filed February 14, 1918. Serial No. 217,038.

*To all whom it may concern:*

Be it known that I, GEORGE ALBERT LYON, a citizen of the United States, and resident of Philadelphia, Philadelphia county, Pennsylvania, have made a certain new and useful Invention Relating to Reinforced Vehicle-Buffers, of which the following is a specification, taken in connection with the accompanying drawing, which forms part of the same.

This invention relates to resilient automobile buffers of the general type covered by the Lyon Patent 1,198,246 of September 12, 1916. The buffer may comprise several resilient strips of spring steel having attaching members to be secured to the automobile frame or other parts of a vehicle and also having transversely extending impact receiving members preferably connected thereto through intermediate resilient curved portions, such as open end loops. The impact receiving members are preferably arranged to overlap adjacent the center of the buffer and be overlapped at this point by one or more resilient strip front reinforcing members which may be arranged on either side of the impact receiving portions or interposed between them and clamped or secured in this overlapping reinforcing position. Any suitable connecting devices or clamps may be used to hold these overlapping strips in close reinforcing position adjacent the center of the buffer front and the clamps may with advantage be the frictionally gripping clamps or encircling clips having diagonally opposite clamp ends as disclosed in said patent. In this way the buffer front may have a central portion of triple strength in which each of the overlapping flat resilient strips adds its proportionate strength and stiffness to the impact receiving portion of the buffer without, however, undesirably reducing the extent of yield which can take place under collision conditions. If desired also double strength portions may be formed in a similar way extending outward beyond the central triple strength portion of the buffer front and it is usually desirable to have these reinforced triple or double strength front portions extend substantially throughout the distance between the frame members of the automobile.

In the accompanying drawings showing in a somewhat diagrammatic way illustrative embodiments of the invention, Figure 1 is a top view of one form of the device.

Fig. 2 is an enlarged top sectional view through the central front portion of a similar buffer.

Fig. 3 is a transverse section thereof taken along the line 3—3 of Fig. 2.

Fig. 4 is a similar transverse section along the line 4—4 of Fig. 2.

Fig. 5 is a top view showing another form of buffer.

Fig. 6 is a similar view showing still another form; and

Fig. 7 is a top view showing a bolted buffer construction.

The buffer may be composed of a number of strips of resilient material, such as tempered spring steel, and these strips at least where they are subject to vertical bending forces are preferably of considerably greater vertical width than thickness so as to make them vertically rigid while resiliently yielding to a much greater extent in horizontal directions. Two such strips are shown in Fig. 1 as having generally similar contour and comprising attaching members to be clamped or otherwise secured to the automobile frame members or to other parts of a vehicle, the attaching member 1, for example, being connected to and preferably integral with the resilient open end portion 2, the strip extending inward to form a transversely extending impact receiving portion or member 4. The other spring steel strip may have an attaching member 5, a resilient loop 6 also extending out into protective position adjacent the automobile wheel and an impact receiving portion or member 7 which preferably overlaps the other impact receiving member 4 which may have an offset end secured by bending this strip at about the point 3 so that its intermediate portion just outside this bend may be substantially in line with the end of the other impact receiving member. One or more front reinforcing strips or members, such as 8, may be arranged in overlapping position in contact with the impact receiving members so as to form a multiple thickness reinforced buffer front and these strips may be connected by any suitable connecting devices, such, for instance, as the clamps indicated, of which a greater or less number may be used to securely connect the parts. The outer clamps 10, 11 may be arranged adjacent the ends of the reinforced double portion of the buffer front and may encircle the resilient strips and be formed with diagonally arranged clamp ends 14, 15, as indicated in Fig. 3, so that these portions may be forcibly brought together by the clamp bolt 13 and nut 12 to clamp the resilient buffer strips or members 4 and 8, together in two directions and thus hold them in vertically rigid position. In this way undesirable rattling and loosening are prevented under running conditions, while at the same time the parts are not held together with such force as to undesirably prevent the resilient yielding action of each of the strips under impact or collision conditions. One or more center clamps, such as 9, may also be used to hold together the triple or multiple strength buffer front as indicated in Fig. 4, and Fig. 1 shows a single central clamp of this same general character, while Fig. 2 indicates the use of two central clamps 16, 17 arranged adjacent each end of the triple strength or thickness portion of the buffer front. In this way each of the three strips contributes its full proportion of strength to this part of the buffer as it bends under impact and during such bending the strips are allowed to slip or slide over each other slightly under the powerful shearing forces developed so that excessive or dangerous fiber stresses are not developed in the outer strips and the extent of resilient yielding action seriously interfered with in this way. Also by using encircling frictional gripping clamps or connecting devices the spring strips do not have to be perforated or their strength impaired to the same extent as where connecting bolts are used which pass through holes or slots in the strips. It is of course understood that the front members of the buffer may thus be adjustably connected together so that the width of the buffer and the distance between its attaching members may be adjusted to suit the distance between frame members of automobiles, for example.

Fig. 5 shows a somewhat different arrangement in which one of the impact receiving members which is preferably arranged in front of the other is given sufficient extra length so that its end 7 may extend slightly beyond the attaching member of the buffer. This impact receiving member may thus form a substantially straight front element against which one or more front reinforcing members, such as 8, may be secured. Also by having the end 19 of this reinforcing member arranged farther from the center of the buffer than the other end it may form a double strength portion corresponding to the double strength reinforced portion consisting of the overlapping impact receiving members on the other side of the buffer front. To give the buffer a symmetrical appearance the end 19 of this front reinforcing member may be symmetrically placed as compared to the end of the impact receiving member 7 and the reinforcing member may be of such length that its other end 18 is symmetrical about the middle of the buffer with respect to the end 4 of the other reinforcing member. In this way double strength portions of substantially equal length may be secured on each side of the triple strength center portion of the buffer front. In clamping this form of buffer together the center clamps 16, 17 may with advantage be arranged adjacent the ends of the triple strength center portion and may slightly overlap the ends thereof so as to conceal the ends 4 and 18 of the front and back strips of this center triple strength portion, and in some cases two such center clamps are sufficient, the arrangement of the overlapping strips being such that an impact force from the front of the buffer is properly resisted by the overlapping double strength ends of the front portion, whether these strips are yieldingly held together by outer clamps or not. For some purposes, however, outer clamps, such as 10, 11, may be used since they serve to further minimize rattling of the strips under running conditions and they also positively hold the ends of the strips together and prevent their spreading apart somewhat as they might do after collision.

Fig. 6 shows another arrangement in which the overlapping impact receiving portions 4 and 7 are straight and of substantially equal length so as to overlap throughout the central reinforced or triple strength part of the buffer front. In this case the reinforcing member 29 which may be clamped against the front or back side of the impact receiving members of the buffer may have one end 20 extend out to form a double reinforced portion of the buffer front in connection with one of the impact receiving members while the other end 21 of this reinforcing member is offset beyond the bend 22 so that it may be brought substantially into line with the end of the adjacent impact receiving member 7, there being, of course, provision for the desired lateral adjustment of the parts in all of these cases to accommodate the variations in width of commercial automobile frames. The buffer front members may in this case be secured together by two center clips or clamps 16, 17 and also by two outer clamps 10, 11, if desired.

As shown in Fig. 7 which corresponds to the disclosure of my co-pending application 213,718, filed January 25, 1918, claiming this bolted arrangement, the front buffer portions may be bolted together by connecting bolts passing through suitable holes or slots in the strips which may as indicated have substantially the same contour as in the buffer shown in Fig. 1. The connecting bolts 23, 24 may have rounded more or less ornamental heads, if desired, and may project through holes in the front reinforcing member 8 of the buffer and also through adjusting openings such as the series of holes 27, 28 in the two impact receiving members 4, 7. In this way the desired range of lateral adjustment of the parts is secured and the front strips are securely held in the adjusted position as by the nuts 25 and lock washers 26, for example, so that a serviceable and economical construction is thus secured, although the full strength of the strips is naturally not effective for resisting collision impacts as in the previously described forms of buffer where the connecting clamps do not impair the cross-section or strength of the strips.

This invention has been described in connection with a number of illustrative embodiments, forms, proportions, parts, materials, arrangements and methods of connection and use, to the details of which disclosure the invention is not of course to be limited, since what is claimed as new and what is desired to be secured by Letters Patent is set forth in the appended claims.

I claim—

1. The automobile buffer comprising a pair of flat spring steel strips each having a front impact receiving member, a rearwardly extending attaching member and an intermediate outwardly extending open loop member adapted to extend into protective position adjacent the automobile wheel, one of said impact receiving members having its end offset to extend around and overlap the end of the other impact receiving member, spring steel strip front reinforcing means adapted to extend across the front of the buffer between the frame members of the automobile and project beyond the ends of said overlapping impact receiving members to form a multiple strength central portion of the buffer front and double strength portions extending outward therefrom and connecting devices encircling said overlapping members and comprising center clamps adjacent the ends of said multiple strength portion of the buffer front and outer clamps adjacent the ends of said double strength portion of the buffer front to hold the overlapping members in vertically rigid and mutually reinforcing coöperation.

2. The automobile buffer comprising a pair of flat spring steel strips each having a front impact receiving member, and an outwardly extending open loop member adapted to extend into protective position adjacent the automobile wheel, spring steel strip front reinforcing means adapted to extend across the front of the buffer between the frame members of the automobile and project beyond the ends of said overlapping impact receiving members to form a multiple strength central portion of the buffer front and double strength portions extending outward therefrom and connecting devices encircling said overlapping members and comprising center clamps adjacent the ends of said multiple strength portion of the buffer front and outer clamps adjacent the ends of said double strength portion of the buffer front to hold the overlapping members in mutually reinforcing coöperation.

3. The automobile buffer comprising two flat spring steel strips each having a front impact receiving member, an extending attaching member and an intermediate resilient curved portion, one of said impact receiving members having its end overlapping the other impact receiving member, a spring steel strip front reinforcing member adapted to overlap and project beyond the ends of said overlapping impact receiving members to form a triple strength central portion of the buffer front and double strength portions extending outward therefrom and connecting devices encircling said overlapping members and comprising center clamps adjacent the end of said triple strength portion of the buffer front and outer clamps adjacent ends of said double strength portion of the buffer front to hold the overlapping members in vertically rigid and mutually reinforcing coöperation at the front of the buffer.

4. The automobile buffer comprising two flat spring steel strips each having a front impact receiving member, an extending attaching member and an intermediate portion, one of said impact receiving members having its end overlapping the other impact receiving member, a spring steel strip front reinforcing member adapted to overlap said overlapping impact receiving members to form a multiple strength central portion of the buffer front and double strength portions extending outward therefrom and connecting devices encircling said overlapping members and comprising center clamps adjacent the ends of said multiple strength portion of the buffer front and outer clamps adjacent the ends of said double strength portion of the buffer front to hold the overlapping members in mutually reinforcing coöperation at the front of the buffer.

5. The automobile buffer comprising two flat spring steel strips each having a front impact receiving member, an extending attaching member and an intermediate portion, one of said impact receiving members having its end overlapping the other impact receiving member, a spring steel strip front reinforcing member adapted to overlap said overlapping impact receiving members to form a multiple strength central portion of the buffer front and double strength portions extending outward therefrom and connecting devices encircling said overlapping members to hold the overlapping members in mutually reinforcing coöperation at the front of the buffer.

6. The automobile buffer comprising a pair of flat spring steel strips each having a front impact receiving member, an extending attaching member and an intermediate outwardly extending loop member, one of said impact receiving members having its end offset to extend around and overlap the end of the other impact receiving member, a spring steel strip front reinforcing member adapted to extend across the front of the buffer between the frame members of the automobile and project beyond the ends of said overlapping impact receiving members to form a triple strength portion of the buffer front and double strength portions extending outward therefrom and connecting devices encircling said overlapping members and comprising center clamps adjacent the ends of said triple strength portion of the buffer front and outer clamps adjacent the ends of said double strength portions of the buffer front to hold the overlapping members in vertically rigid and mutually reinforcing cooperation at the front of the buffer.

7. The automobile buffer comprising a pair of flat spring steel strips each having a front impact receiving member, an extending attaching member and an intermediate outwardly extending loop member, one of said impact receiving members having its end overlapping the other impact receiving member, a spring steel strip front reinforcing member adapted to extend across the front of the buffer between the frame members of the automobile and project beyond the ends of said overlapping impact receiving members to form a triple strength central portion of the buffer front and double strength portions extending outward therefrom and connecting devices encircling said overlapping members to hold the overlapping members in vertically rigid and mutually reinforcing coöperation at the front of the buffer.

8. The automobile buffer comprising a pair of flat spring steel strips each having a front impact receiving member, one of said impact receiving members having its end overlapping the other impact receiving member, a spring steel strip front reinforcing member adapted to extend across the front of the buffer between the frame members of the automobile to form a triple strength central portion of the buffer front and double strength portions extending outward therefrom and connecting devices to hold the overlapping members in vertically rigid and mutually reinforcing coöperation at the front of the buffer.

9. The automobile buffer comprising a pair of flat spring steel strips each having a front impact receiving member, one of said impact receiving members having its end overlapping the other impact receiving member, a spring steel strip front reinforcing member adapted to form a triple strength central portion of the buffer front and double strength portions extending outward therefrom and connecting devices to hold the overlapping members in mutually reinforcing coöperation at the front of the buffer.

10. The automobile buffer comprising two flat spring steel strips each having a front impact receiving member, an extending attaching member and an intermediate resilient curved member, one of said impact receiving members having its end overlapping the other impact receiving member, reinforcing means comprising a spring steel strip front reinforcing member adapted to overlap and project beyond the ends of said overlapping impact receiving members to form a multiple strength central portion of the buffer front and double strength portions extending outward therefrom, one of said overlapping members having an offset portion to extend around the end of another and connecting devices to adjustably hold the overlapping members in mutually reinforcing coöperation.

11. The automobile buffer comprising two flat spring steel strips each having a front impact receiving member and an integral extending member, one of said impact receiving members having its end overlapping the other impact receiving member, reinforcing means comprising a spring steel strip member adapted to overlap said overlapping impact receiving members to form a multiple strength central portion of the buffer front and double strength portions extending therefrom, one of said overlapping members having an offset portion to extend around the end of another and connecting devices to hold the overlapping members in mutually reinforcing coöperation.

12. The automobile buffer comprising two flat spring steel strips each having a front impact receiving member and an extending attaching member, one of said impact receiving members overlapping the other impact receiving member, reinforcing means comprising a spring steel strip member adapted to overlap said overlapping impact receiving members to form a multiple strength central portion of the buffer front and a double strength portion extending outward therefrom and connecting devices to adjustably secure the overlapping members in mutually reinforcing coöperation.

13. The automobile buffer comprising two flat spring steel strips each having a front impact receiving member, an extending attaching member and an intermediate member, one of said impact receiving members having its end overlapping the other impact receiving member, reinforcing means comprising a spring steel strip member adapted to overlap said overlapping impact receiving members to form a multiple strength central portion of the buffer front and double strength portions extending therefrom, one of said overlapping members having an offset portion to extend around the end of another and connecting devices to adjustably secure the overlapping members in mutually reinforcing coöperation without substantially impairing their resilient resistance.

14. The automobile buffer comprising two flat spring steel strips each having a front impact receiving member and a permanently connected extending attaching member, one of said impact receiving members overlapping the other impact receiving member, reinforcing means comprising a spring steel strip member adapted to overlap said overlapping impact receiving members to form a multiple strength central portion of the buffer front and connecting devices to hold the overlapping members in mutually reinforcing coöperation without substantially impairing their resilient resistance to impact.

GEORGE ALBERT LYON.

Witnesses:
HARRY L. DUNCAN,
JESSIE B. KAY.